May 3, 1966  J. P. FAY  3,249,839
PHASE CONTROLLED SCR CIRCUITS FOR MOTOR SPEED CONTROL SYSTEM
Filed April 16, 1963  2 Sheets-Sheet 1
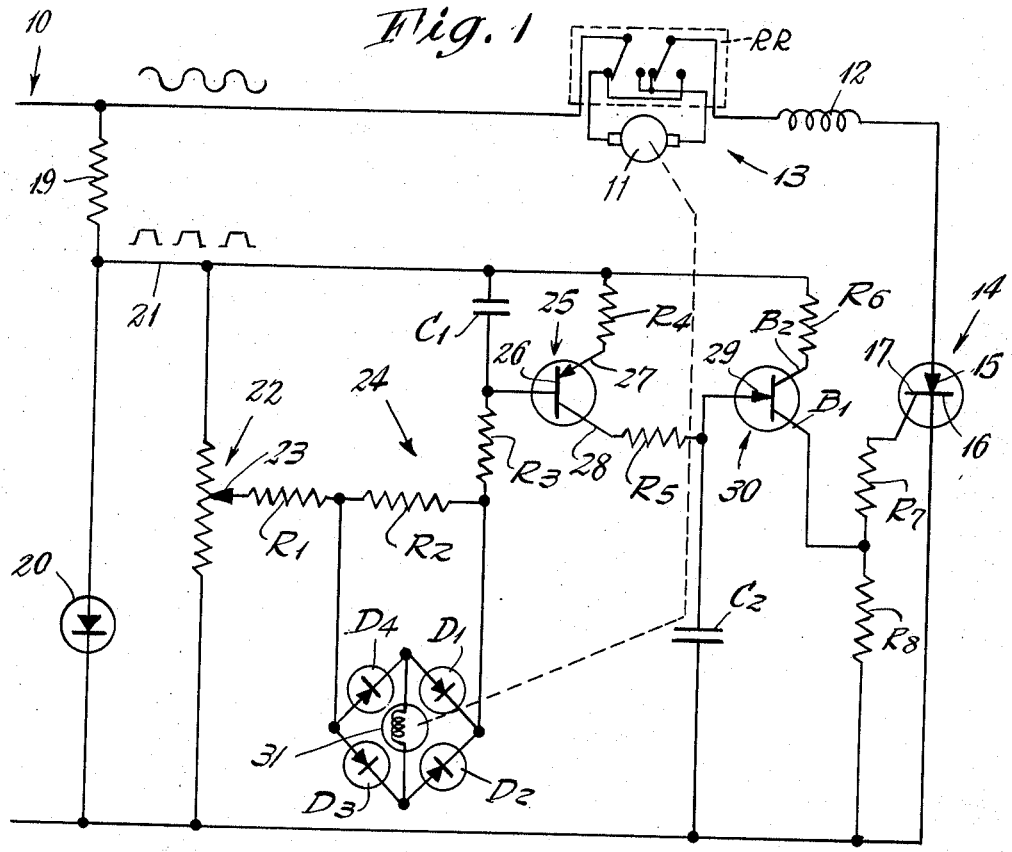
Fig. 1
(a)
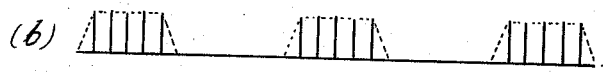
(b)
(c)
} Fig. 2
(a)
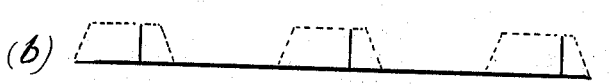
(b)
(c)
} Fig. 3
INVENTOR.
James P. Fay
BY
Johnson and Kline
ATTORNEYS May 3, 1966     J. P. FAY     3,249,839
PHASE CONTROLLED SCR CURCUITS FOR MOTOR SPEED CONTROL SYSTEM
Filed April 16, 1963     2 Sheets-Sheet 2
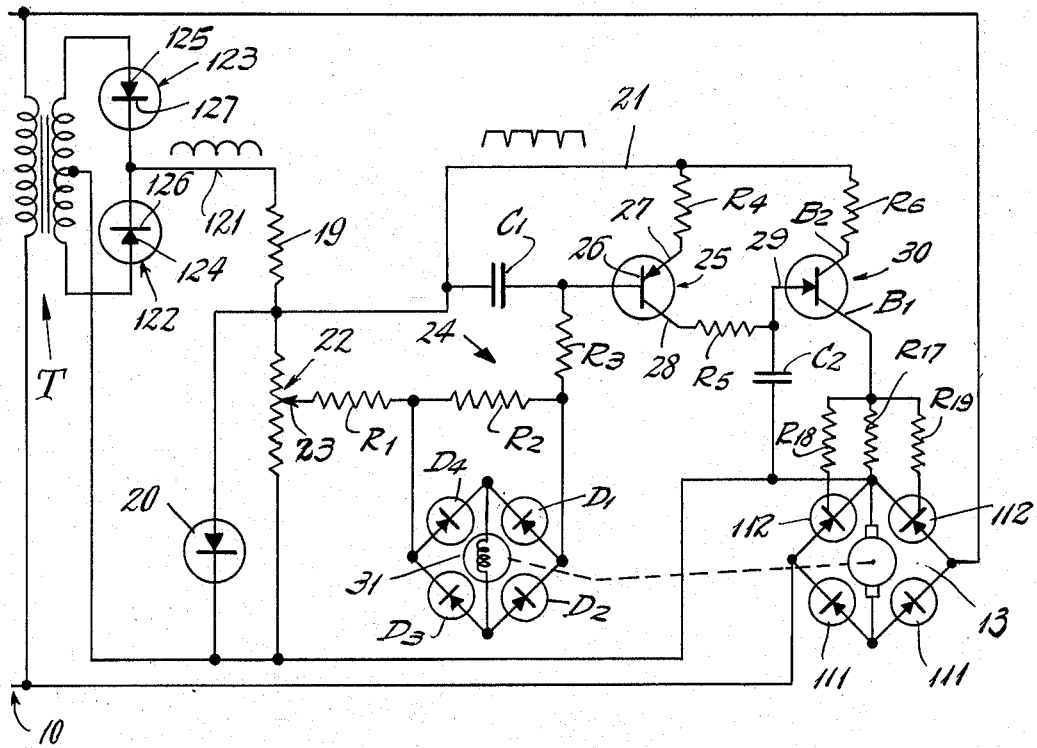
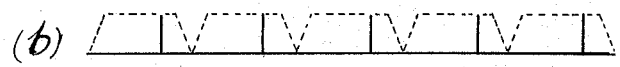
INVENTOR.
James P. Fay
BY
Johnson and Kline
ATTORNEYS

United States Patent Office 3,249,839
Patented May 3, 1966

3,249,839
PHASE CONTROLLED SCR CIRCUITS FOR MOTOR SPEED CONTROL SYSTEM
James P. Fay, Norwalk, Conn., assignor to Nutmeg Electronics Corporation, Norwalk, Conn., a corporation of Connecticut
Filed Apr. 16, 1963, Ser. No. 273,346
4 Claims. (Cl. 318—327)

The present invention relates to a motor control means and more particularly to the control of a commutator motor having series-connected field and armature windings when fed from a source of A.C.

Heretofore, efforts have been made to provide a control for such motors, but they have been ineffective because they did not hold the regulated speed to a close degree of tolerance with change in load and did not have a wide range of speeds over which they could effectively hold the speed under varying loads.

The present invention overcomes these difficulties by providing a commutator motor having series-connected field and armature windings fed from a source of A.C. which is operative substantially in excess of 90° of the voltage wave, which has a wide speed variation and, at any selected speed, will maintain the substantially selected speed through a wide range of torque demand.

It is an object, therefore, of the present invention to provide a motor in which the speed can be varied over a wide range and when a selected speed is provided it will remain substantially at that speed through large variations in the torque required.

This is accomplished by providing a novel control circuit in which a controllable rectifier is included in series with the motor and is controlled by a novel control circuit embodying a unijunction transistor having its emitter connected to a resistance-capacitance circuit controlled by a transistor connected across a source of a control voltage, which transistor has selected negative voltage applied to its base by a resistance means for controlling the flow of current therethrough to regulate the rate of charging of a capacitor which controls a unijunction transistor to fire a controllable rectifier at different phase positions of the A.C. line voltage.

The control circuit also includes a means embodying rectifier means and a tachometer generator separate from but driven by the motor and connected in the resistance means in the circuit to the transistor for controlling the negative voltage applied thereto in accordance with the speed of the motor. By use of the tachometer generator, the control system can be used with various motors without regard to the flux distribution in the said motors, thus providing a more uniform control.

The control means of the present invention can be used in either half-wave or full wave motor drives and can be provided with reversing means if desired.

Other features and advantages of the invention will be apparent from the specification and claims when considered in connection with the accompanying drawings in which:

FIGURE 1 shows the circuit for the half-wave control.

FIG. 2 shows diagrammatically the conditions in the circuit of FIG. 1 for a high speed setting.

FIG. 3 shows diagrammatically the conditions in the circuit of FIG. 1 for a low speed setting.

FIG. 4 shows the circuit for a full wave control.

FIG. 5 shows diagrammatically the conditions in the circuit of FIG. 4 for a high speed setting.

FIG. 6 shows diagrammatically the conditions in the circuit of FIG. 4 for a low speed setting.

As shown in the drawings, a source of A.C. voltage 10 has connected in series therewith the armature 11 and series-connected field 12 of a commutator motor 13. This can be a D.C. motor, universal motor or the like. Connected also in series with the motor across the A.C. line is a controllable rectifier 14. While this may be thyratron or the like, it is at present preferred to employ a silicon controlled rectifier, which has its anode 15 and cathode 16 connected in series with the motor and its gate 17 connected to a control circuit embodying a unijunction transistor 29 to control the firing angle of the silicon controlled rectifier as will be described.

In the form of the invention shown in FIG. 1, a half-wave control system is provided in which the circuit is supplied with a low voltage by a resistor 19 and zener diode 20 series-connected across the A.C. line and has the positive side of a control line 21 connected between the resistor and zener diode to produce a low voltage thereon having a wave form which periodically drops to zero. In this form of the invention, the wave is a square wave as indicated in FIG. 1 having, for example, a maximum voltage of 22 volts.

Connected across the source of low voltage is a potentiometer 22, the movable contact 23 of the which is connected by resistance means 24 to the base of a transistor 25. By adjusting the potentiometer the speed of the motor can be varied over a wide range as will be explained. In the illustrated form of the invention the resistance means comprises resistors R1, R2 and R3. A capacitor C1 is connected between the positive side of the control line and the terminal of the resistance means connected to the base 26 of the transistor. The emitter terminal 27 of the transistor is connected through a resistor R4 to the positive side of the control line and the collector terminal 28 of the transistor is connected to a resistor R5 connected in series with a capacitor C2 to the negative side of the control line. The resistor R4 will act as a torque controller and will prevent bumping at low speeds.

The potentiometer and resistance means provides the required negative bias to the base of the transistor to control the flow of current to and the charging rate of the capacitor C2. Connected between the resistor R5 and capacitor C2 is the emitter terminal 29 of a unijunction transistor 30 which has its base contact B2 connected through a current limiting resistor R6 to the positive side of the control line and has its base contact B1 connected to the gate 17 of the controllable rectifier 14 through resistor R7 so as to fire the controllable rectifier in response to the discharge of the capacitor in a predetermined phase relation to the phase of the A.C. line and thus control the flow of current through the motor to regulate its speed and torque. A resistor R8 is connected between resistor R7 and the negative terminal of the line for providing a ground return from the trigger circuit to the cathode.

A consideration of the diagrams in FIGS. 2 and 3 will graphically illustrate the action of the control circuit for each positive half-wave. FIG. 2 represents the condition in the control circuit when the potentiometer is set for a high speed. In this figure the diagram (a) represents the voltage on the capacitor C2 illustrating high rate of charging of the capacitor C2, the diagram (b) represents the voltage on B1 for firing of the controlled rectifier and the diagram (c) represents the voltage applied to the motor for substantially 180° of the A.C. wave. From these it will be noted that the capacitor C2 is charged and discharged a large number of times in each cycle and causes the firing of the controlled rectifier early in the cycle resulting in the voltage to drive the motor to be effective for substantially greater than 90° of the cycle. FIG. 3 represents the condition in the control circuit when the potentiometer is set for a low speed. It will be noted in diagram (a) that the voltage on C2 and the charging rate of capacitor C2 is much slower and as shown in diagram (b) the voltage on B1 and the firing of the rectifier occurs much later in the cycle, and the voltage applied to the motor is considerably less than in FIG. 2.

Connected to but separate from the motor to be rotated therewith is a usual tachometer generator 31. The generator is connected to the circuit through rectifier means so as to provide a counter voltage to the resistance means in accordance with the speed of rotation of the motor. In the illustrated form of the invention, the rectifier means comprises a bridge having suitable diodes D1, D2, D3, D4 in the legs of the bridge with the generator 31 connected across the bridge, which bridge is connected on opposite sides of the resistor R2 to produce the required feedback into the resistance circuit. Thus, it will be seen that as the speed of the motor varies, the tachometer generator will provide a corrective positive bias to oppose the negative voltage applied to the base and thus control the flow of current through the transistor in the charging circuit for the capacitor to vary the rate at which the capacitor is charged and discharged. This, in turn, will vary the firing of the unijunction transistor to control the firing of the controllable rectifier to stabilize the motor speed at the speed determined by the setting of the potentiometer. The capacitor C1 will filter or smooth out the pulses of the feedback voltage and will prevent too rapid change in the rate of charging of the capacitor C2 and thus prevent any tendency toward hunting.

If desired, a reversing relay RR can be connected across the armature to reverse the motor so that the operator can control the direction of rotation of the motor.

In the form of the invention shown in FIG. 4, a full wave control system is provided in which the commutator motor 13 is connected across the line 10 supplying an A.C. voltage and is supplied with unidirectional pulses in order to utilize the full wave to drive the motor.

This is accomplished by connecting the terminals of the motor across a rectifier bridge circuit having in the opposite legs on each side of the motor a diode 111 and a controllable rectifier 112 and providing the unidirectional pulses to the motor. The two rectifiers 112 which are of the controllable type have their cathodes connected to the motor and are gated at a selected phase angle of each half-wave so that whichever has its anode positive with respect to its cathode will be placed in a conductive condition. In this way the current to the motor may be varied up to a duty cycle approaching 100%.

In order to control the gating of the controllable rectifiers, the gates are connected to a control circuit. As shown in FIG. 4, the control circuit comprises a transformer T connected across the A.C. line and having its secondary connected so as to provide the control line with positive wave forms which periodically go to zero as indicated on line 121. This is accomplished by providing a pair of diodes 122, 123 having the anodes 124, 125 connected to the terminals of the secondary and the cathodes 126, 127 connected to the line 121 to provide full wave rectification. Connected across the line is a control means similar to that of FIG. 1 embodying a zener diode 20 and a resistor 19 which provides a low voltage control circuit having a clipped wave provided with periodic points of reduction to zero as shown on the control line 21. A potentiometer 22 is connected across the control line and has its movable contact 23 connected through resistance means 24, have resistors R1, R2, R3, to the base 26 of the transistor 25 so as to provide the required negative potential on the circuit to control the speed of the motor. The transistor 26 has its base also connected to line 21 through capacitor C1 and its collector terminal 28 connected to the resistor R5-capacitor C2. The emitter terminal 27 of the transistor is connected to the control line through resistor R4 and the action of the transistor determines the rate of charging and discharging of the capacitor C2. The emitter terminal 29 of a unijunction transistor 30 is connected to the terminal of the capacitor C2 and has its base terminal B2 connected to the control line through a resistor R6. Its base terminal B1 is connected to the junction of the gates, and through limiting resistors R17, R18, R19, operates to fire the control rectifiers 112 at varying phases of the wave of the impressed A.C. so as to control the speed of the motor. A tachometer generator 31 is connected to the motor and is connected across a rectifier bridge having diodes D1, D2, D3, D4, which rectifier bridge is connected across the resistor R2 of the resistance means to feed a positive voltage to the resistance means to alter the negative voltage supplied thereby in accordance with the speed of the motor.

FIGS. 5 and 6 graphically illustrate the action of the control circuit for each half cycle of the wave. FIG. 5 represents the conditions in the control circuit when the potentiometer is set for a high speed. In this figure the diagram (a) represents the voltage across C2 and illustrates high charging rate of the capacitor C2 for each of the half cycles of the wave. The diagram (b) shows the voltage on B1 and the firing of the control rectifiers 112 early in each half cycle of the wave and the diagram (c) represents the voltage applied to the motor for substantially 180° for each of the half cycles of the A.C. wave.

FIG. 6 represents a condition in which the control circuit is set for low speed. It will be noted that in diagram (a) the charging rate of the capacitor is much slower than that of FIG. 5 and as shown in diagram (b) the initial firing of the control rectifier occurs late in the cycle so that as shown in diagram (c) the voltage on the motor for each half-wave is considerably less than that when energized for high speed.

Thus, it will be seen that the present invention provides a novel control system for commutator type motors having a wide range of speed settings and which, in each speed setting, will substantially hold the speed through wide ranges of load and independently of the fluxed distribution in the motor.

Variations and modifications may be made within the scope of the claims and portions of the improvement may be used without others.

I claim:

1. A speed regulating system for a commutator motor having series-connected field and armature windings fed from a source of A.C. voltage comprising a controllable rectifier having its anode-cathode circuit in series with said motor and its gate circuit connected to a unijunction transistor to be fired thereby, means for controlling the firing of the unijunction transistor to fire the controllable rectifier comprising a zener diode and series-connected resistor connected across the source of A.C. voltage to provide a source of low voltage having a wave from which periodically drops to zero, a potentiometer connected across the low voltage source, resistance means connecting a movable contact of the potentiometer to the base of a transistor to apply a selected negative voltage thereto, said transistor having its emitter and collector connected across the source of low voltage and in series with a resistor and capacitor, said selected negative potential reducing and controlling the resistance of the base to vary the flow of current between the collector and emitter and the rate of charging of the capacitor, said unijunction transistor having an emitter junction connected to the junction between said resistor and capacitor to be fired by the discharge of said capacitor and fire the controlled rectifier at a selected phase angle, and means including rectifier means and a tachometer generator separate from and driven by the motor and connected across the resistance means to vary the selected negative voltage in accordance with the speed of the motor.

2. A speed regulating system for a commutator motor having series-connected field and armature windings fed from a source of A.C. voltage comprising a silicon controlled rectifier having its anode-cathode circuit in series with said motor and its gate circuit connected to a unijunction transistor to be fired thereby, means for controlling the unijunction transistor to fire the silicon controlled rectifier comprising a zener diode and series-connected resistor connected across the source of A.C. voltage to provide a source of low voltage having a squared wave, a potentiometer connected across the low voltage source, resistance means connecting a movable contact on the potentiometer to the base of a transistor to apply a selected negative voltage thereto, said transistor having its emitter and collector connected across the source of low voltage and in series with a resistor and capacitor, said selected negative potential reducing and controlling the resistance of the base to vary the flow of current between the collector and emitter and the rate of charging of the capacitor, said unijunction transistor having an emitter junction connected to the junction between said resistor and capacitor to be fired by the discharge of said capacitor and fire the silicon controlled rectifier at a selected phase angle with respect to said A.C. voltage, and a bridge circuit including a tachometer generator, said bridge circuit being connected across the resistance means to vary the selected negative voltage in accordance with the speed of the motor.

3. In a half-wave speed regulating system, a commutator motor having a series-connected armature and field connected across a source of A.C. voltage and having a silicon controlled rectifier in series therewith, said silicon controlled rectifier having the circuit thereof connected to a unijunction transistor having an emitter junction to be alternately fired thereby, means for controlling the firing of the unijunction transistor to fire the silicon controlled rectifier comprising a zener diode and series-connected resistor connected across the source of A.C. voltage to provide a source of low voltage having a squared half-wave, a potentiometer connected across the low voltage source, resistance means connecting a movable contact of the potentiometer to the base of a transistor to apply selected negative voltage thereto to select the speed of the motor, said transistor having its emitter and collector connected across the source of low voltage and in series with a resistor and capacitor, said selected negative potential reducing and controlling the resistance of the base of the transistor to vary the flow of current between the collector and emitter and the rate of charging of the capacitor, said unijunction transistor having the emitter junction connected to the junction between said resistor and capacitor to be fired by the discharge of said capacitor to fire the silicon controlled rectifier at a selected phase angle with respect to the A.C. voltage, and a bridge circuit having a tachometer generator driven by the motor, said bridge circuit being connected across the resistance means to vary the selected negative voltage in accordance with the speed of the motor.

4. In a full wave speed regulating system, a commutator motor having a series-connected armature and field connected across a rectifier bridge which bridge is connected to a source of A.C. voltage, said bridge having silicon controlled rectifiers and diodes in the legs thereof with the cathodes of the silicon controlled rectifiers connected to said motor and their gate circuits connected to a unijunction transistor having an emitter junction to be alternately fired for each half-wave, means for controlling the firing of the unijunction transistor to fire the silicon controlled rectifiers comprising a full wave rectifier connected across the secondary of a transformer connected to the source of A.C. voltage, a zener diode and series-connected resistor connected across the full wave rectifier to provide a source of low voltage having a squared wave form which periodically drops to zero, a potentiometer connected across the low voltage source, resistance means connecting a movable contact of the potentiometer to the base of a transistor to apply selected negative voltage thereto to select the speed of the motor, said transistor having its emitter and collector connected across the source of low voltage and in series with a resistor and capacitor, said selected negative potential reducing and controlling the resistance of the base to vary the flow of current between the collector and emitter and the rate of charging of the capacitor, said unijunction transistor having the emitter junction connected to the junction between said resistor and capacitor to be fired by the discharge of said capacitor and fire the silicon controlled rectifiers at a selected phase angle with respect to the A.C. voltage, and a bridge circuit having a tachometer generator driven by the motor, said bridge circuit being connected across a part of the resistance means to vary the selected negative voltage in accordance with the speed of the motor.

References Cited by the Examiner

UNITED STATES PATENTS

| | | | |
|---|---|---|---|
| 3,095,534 | 6/1963 | Cockrell | 318—331 X |
| 3,123,757 | 3/1964 | Gaudet | 318—327 |

OTHER REFERENCES

Publication: GESCR Manual, 2nd ed., Auburn, New York, 1961, TK 2798 64G. pp. 123–125.

ORIS L. RADER, *Primary Examiner.*

S. GORDON, J. C. BERENZWEIG,
*Assistant Examiners.*